United States Patent [19]

Rusterholz et al.

[11] Patent Number: 4,839,845
[45] Date of Patent: Jun. 13, 1989

[54] METHOD AND APPARATUS FOR PERFORMING A VECTOR REDUCTION

[75] Inventors: John T. Rusterholz, Roseville; John R. Schomburg, Minneapolis, both of Minn.

[73] Assignee: Unisys Corporation, Blue Bell, Pa.

[21] Appl. No.: 846,414

[22] Filed: Mar. 31, 1986

[51] Int. Cl.$^4$ .......................................... G06F 15/347
[52] U.S. Cl. .................................................... 364/736
[58] Field of Search ............... 364/736, 757, 768, 786, 364/200

[56] References Cited

U.S. PATENT DOCUMENTS

| | | | |
|---|---|---|---|
| 3,761,698 | 4/1973 | Stephenson | 364/757 X |
| 3,900,723 | 8/1975 | Bethany et al. | 364/736 |
| 4,435,765 | 3/1984 | Vehida et al. | 364/200 |
| 4,507,728 | 3/1985 | Sakamoto et al. | 364/200 |
| 4,525,796 | 6/1985 | Omoda et al. | 364/200 X |

OTHER PUBLICATIONS

Oberman, *Digital Circuits For Binary Arithmetic*, John Wiley & Sons, 1979, pp. 107–108.

*Primary Examiner*—David H. Malzahn
*Attorney, Agent, or Firm*—Charles A. Johnson

[57] ABSTRACT

A vector data reduction to a scalar result in which adjacent elements in the vector are paired and each pair is sequentially reduced in an arithmetic unit organized for so-called pipe line operation is described. The results of each paired pass are stored as result vector elements and these elements are similarly paired, sequentially operated upon, and stored as result vector elements. The process continues until there is but one pair left which is operated upon to produce a singular, scalar result.

3 Claims, 5 Drawing Sheets

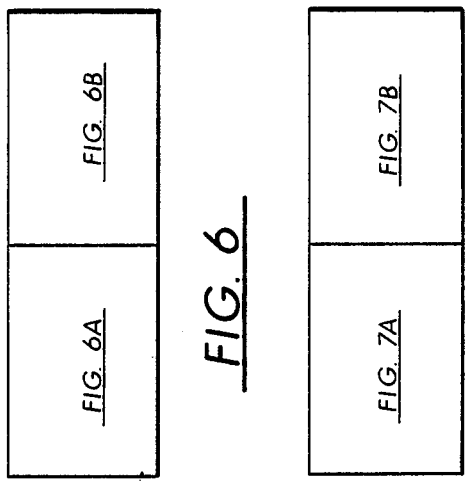
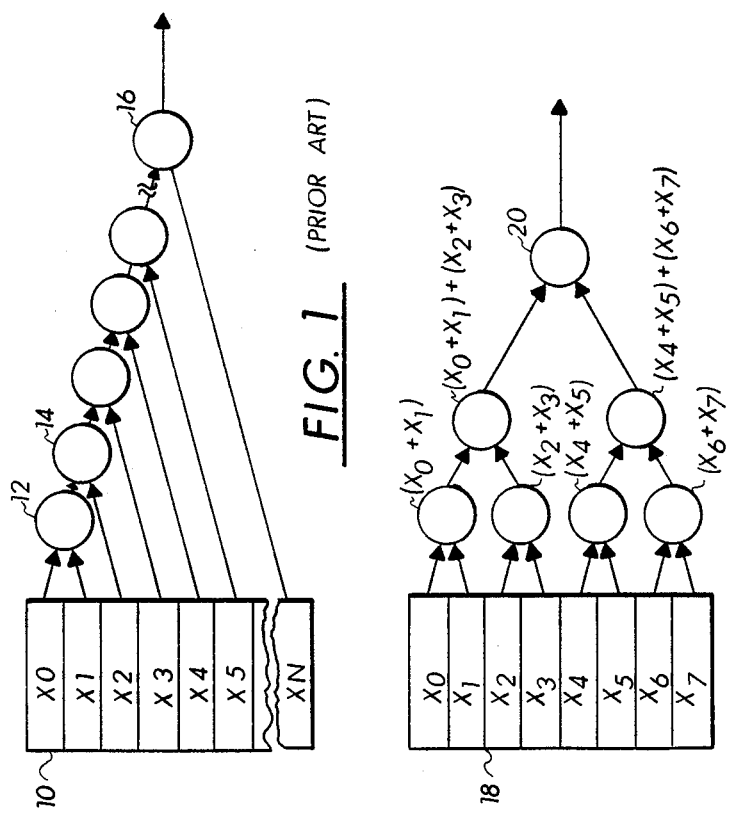
FIG. 1 (PRIOR ART)
FIG. 2

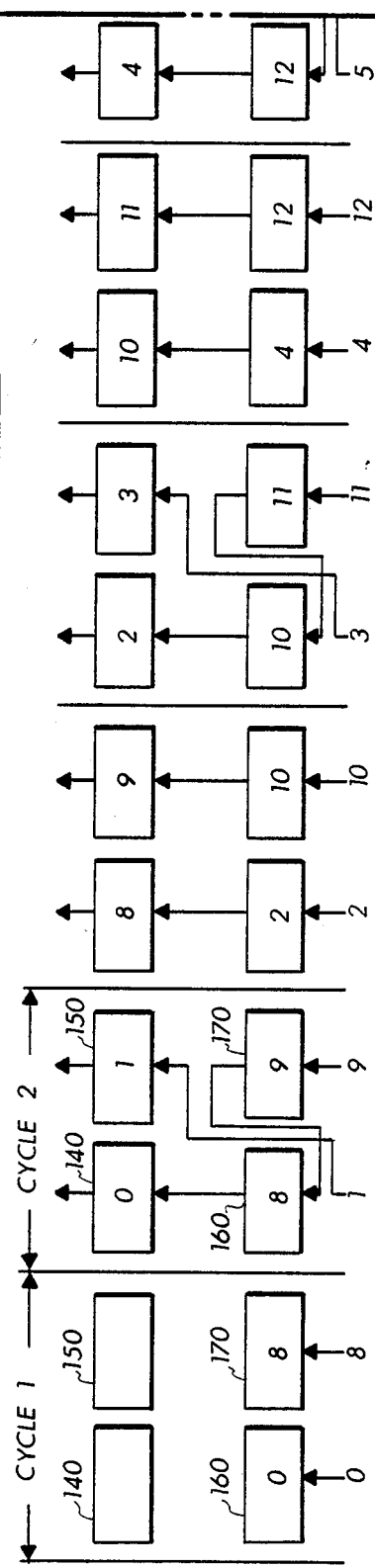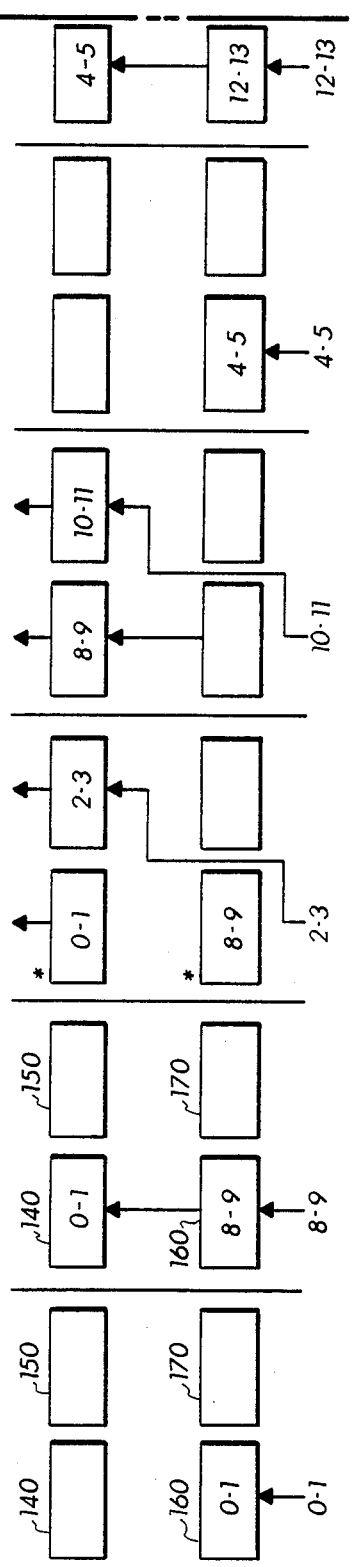

METHOD AND APPARATUS FOR PERFORMING A VECTOR REDUCTION

RELATED PATENT APPLICATIONS

The following co-pending patent applications are assigned to the assignee of this invention, and their teachings are incorporated herein by this reference:

| TITLE: | SCIENTIFIC PROCESSOR VECTOR FILE ORGANIZATION |
|---|---|
| | Inventor: Archie E. Lahti |
| | Serial No.: 761,201 |
| | Filed: July 31, 1985 |
| TITLE: | A SCIENTIFIC PROCESSOR |
| | Inventors: Louis B. Bushard |
| | Larry L Byers |
| | James R. Hamstra |
| | Charles J. Homan |
| | Archie E. Lahti |
| | John T. Rusterholz |
| | Serial No.: 761,137 |
| | Filed: July 31, 1985, |

BACKGROUND OF THE INVENTION

1. Field of the Invention

This invention relates to programmable digital data processors which process so-called vector instructions, particularly vector reduction instructions. More specifically, it relates to a novel method and apparatus for performing vector reductions.

2. Description of the Prior Art

As will be appreciated by those skilled in the art, in certain data processing applications, particularly computational applications carried out in scientific processors, it is advantageous to have an efficient hardware implementation of an instruction called a "vector reduction" instruction. A vector can be thought of as simply a column of binary numbers or other specified data stored in predetermined locations in a memory or register. The reduction operation is, for example, addition or multiplication yielding a result which is the sum or product of all the elements of the vector. Reduction operations may include not only addition and multiplication, but also logical operations and comparisons for determining the largest or smallest element of the vector.

Instructions and techniques for implementing vector reductions are known in the prior art. Most prior art algorithms or strategies are straight forward. FIG. 1 illustrates graphically one prior art strategy. Here a vector comprised of data elements $X_O$ through $X_n$ are reduced to a single result (called a scalar) through addition. The data elements or operands are combined sequentially. That is, the partial result of $X_0 + X_1$ is first obtained and this partial result ($X_0 + X_1$ is combined with $X_3$ (($X_0 + X_1) + X_3$) and that partial result is then combined with $X_4$ and so on.

This prior art approach has several disadvantages. Digital data processors, as a practical matter, have a limit on the size of the number which they can handle on either side of the decimal point. With the prior art vector reduction techniques there is a possibility of temporary overflows and round-off error accumulation. The ordering or sequence of the entire vector can be important.

Objects of this invention include the provision of a novel, stable method and a low hardware cost implementation for performing vector reductions, particularly in scientific processors where there is an emphasis on a large number of floating point computations.

SUMMARY OF THE INVENTION

Briefly, this invention contemplates a vector data reduction to a scalar result in which adjacent elements in the vector are paired and each pair is sequentially reduced in an arithmetic unit organized for so-called pipe line operation. The results of each pass are stored as result vector elements and these elements are similarly paired, sequentially operated upon, and stored as result vector elements. The process continues until there is but one pair left which is operated upon to produce a singular, scalar result.

BRIEF DESCRIPTION OF THE DRAWINGS

The following is an explanation of certain specific embodiments of the invention which will make reference to the accompanying drawings, in which:

FIG. 1 is a pictorial representation of a vector and a vector reduction method in accordance with the teachings of the prior art;

FIG. 2 is a pictorial representation of a vector and the paired vector reduction technique in accordance with the teachings of this invention;

DETAILED DESCRIPTION OF THE PREFERRED EMBODIMENTS

Figure 3:
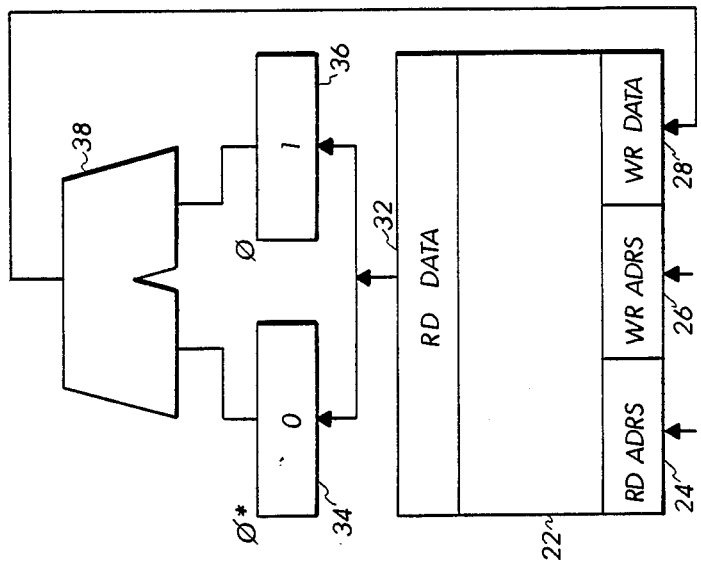
FIG. 3 is a simplified block diagram of a system for the pair-wise reduction of vectors in accordance with the teachings of this invention.

As previously mentioned, FIG. 1 represents a vector 10, which in this illustrative embodiment, comprises a column of data elements numbered $X_0-X_{14}$ stored in a suitable vector memory or register. The data elements may each comprise a binary number and the reduction operation may be to find the sum of all of the binary numbers in the vector. That is, the contents in storage element 0 are added to the contents of storage element 1 and so on until a single result is obtained.

In prior art vector reductions illustrated in FIG. 1, the contents of data storage element $X_0$ are added to the contents of data storage element $X_1$, as indicated by the circle 12 in FIG. 1, and the result thus obtained is added to the content of data storage element $X_2$ at the step indicated at circle 14. The process proceeds, as illustrated in the figure, until a scalar result is obtained in the step indicated by circle 16.

Referring now to FIG. 2, in accordance with the teachings of this invention, the elements of a vector are arranged into pairs of adjacent elements. FIG. 2 shows an illustrative eight element vector 18. That is, elements $X_0$ and $X_1$ are paired, elements $X_2$ and $X_3$ are paired, elements $X_4$ and $X_5$ are paired, and elements $X_6$ and $X_7$ are paired. Each pair is successively reduced, such as, for example, by addition, and the result of the operation on each pair forms a result vector comprised of elements $X_0+X_1$, $X_2+X_3$, $X_4+X_5$, and $X_6+X_7$. This result vector is again paired and reduced as indicated in FIG. 2 leaving, in this illustrative embodiment, a resultant two element vector. This final pair is reduced at 20 to yield a final scalar result.

The technique is applicable to a vector of any length and in a typical application the vector would include 32 elements. If at any stage the number of elements is not even, the odd element is simply passed forward to the next stage by any convenient means. The number of passes through the vector in order to perform a pair-wise reduction is, of course, related to the number of elements in the vector. Further, it will be appreciated that in the preferred embodiment of the invention adjacent elements in the vector are paired, particularly in the initial pairing. While alternative pairing schemes are possible, they are by and large not as practical.

FIG. 3 shows a simplified block diagram of a portion of a data processing system for carrying out vector reductions in accordance with the teachings of this invention. The system comprises a vector memory 22 in which the stored elements can be ordered in sequential locations. The memory may be a conventional random access store and has a conventional read address logic 24, write address logic 26, and write data logic 28.

Read data output logic 32 couples the data elements read from the store 22 alternatively to a pair of read operand data registers 34 and 36. The registers 34 and 36 pair the vector elements and these pairs are coupled to an arithmetic unit 38 which performs a reduction function on the paired elements, such as addition, multiplication, a logical operation, or a comparison for determining the largest or smallest element of the vector. In the preferred embodiment of the invention, the arithmetic unit 38 is a so-called arithmetic pipeline.

As will be appreciated by those skilled in the art, in an arithmetic unit organized in a so-called pipeline architecture, the steps in carrying out a particular arithmetic operation are performed in a series of steps as the data moves, as it were, from station to station along the pipeline. Thus, the first paired elements of the vector can be entered into the arithmetic pipeline, stepped along and a second pair entered before the arithmetic operation is completed upon the first pair, and so on for succeeding pairs depending upon the number of stations in the pipeline.

The operation of FIG. 3 is a straight forward vector reduction in accordance with the principles set forth in connection with FIG. 2. The elements in the vector memory 22 are read out sequentially and stored as pairs in registers 34 and 36. These pairs are coupled to the arithmetic pipeline 38 where the appropriate reduction function is performed and the results of the first pass are written back into the vector store as a resultant vector. The process is repeated until a scalar result is obtained. It will be appreciated that the flow of data through the arithmetic pipeline 38 will have gaps due to a need to store both elements of the pair prior to starting the next arithmetic operation.

Figure 6B:
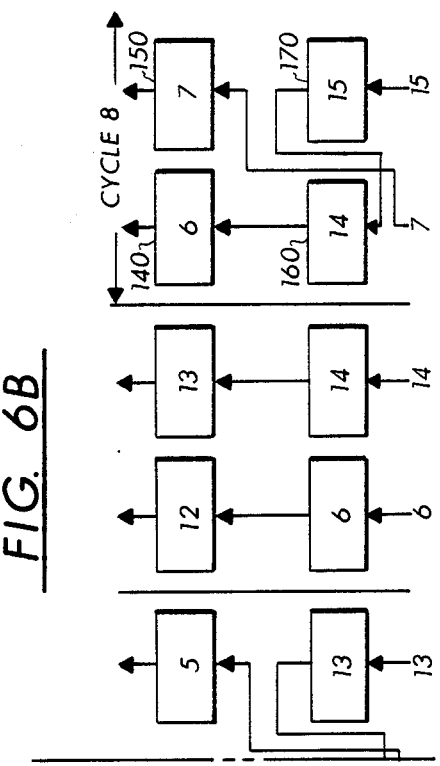
FIG. 6 includes FIGS. 6A and 6B positioned as shown and taken together depicts the flow of vector elements through the read operand data registers and the read operand data staging registers for eight cycles of an initial pass of a pair-wise vector reduction in the apparatus of FIG. 4.
Figure 4:
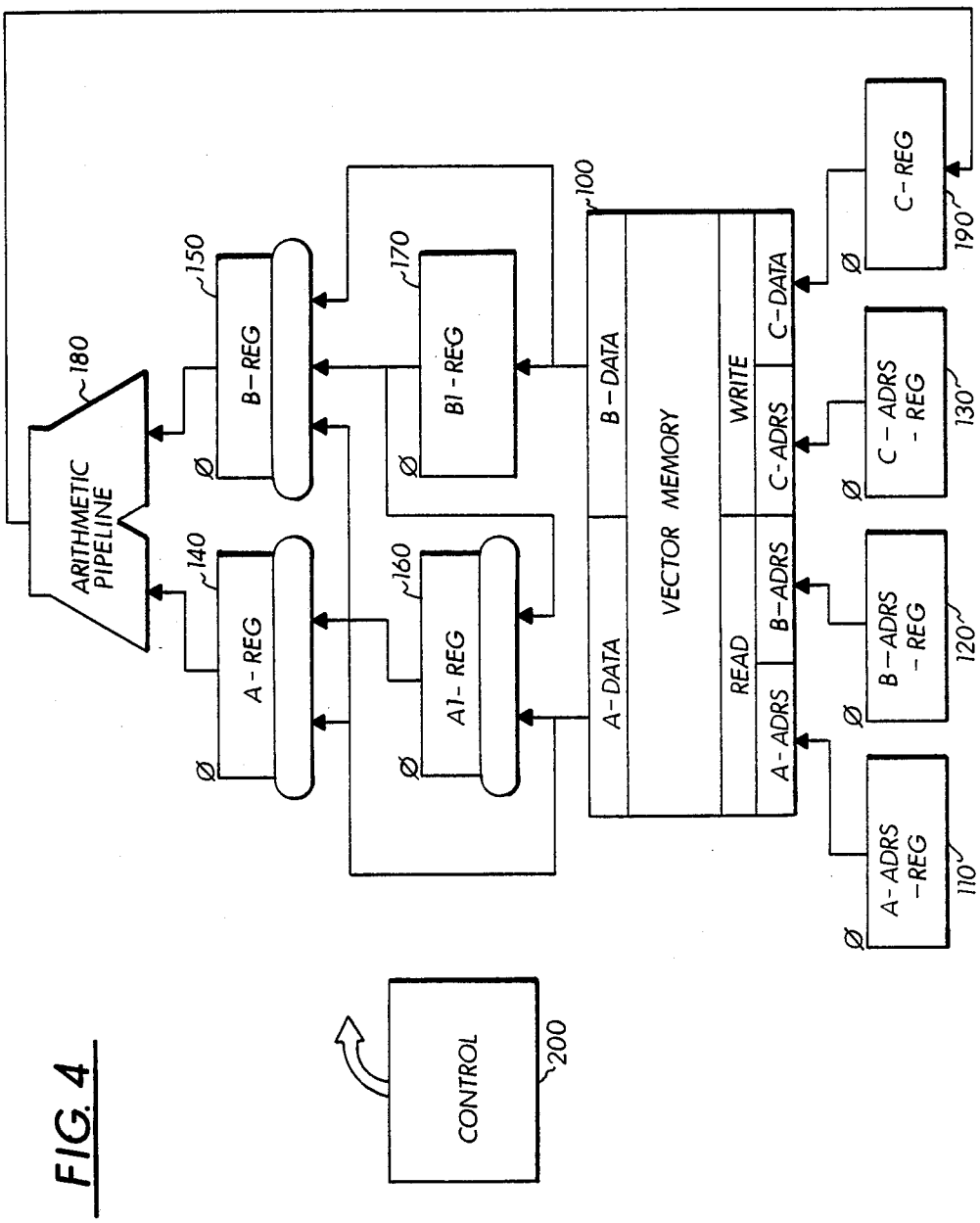
FIG. 4 is a schematic block diagram of apparatus for performing pair-wise vector reductions in accordance with the teachings of this invention. This embodiment of the invention uses an arithmatic pipeline efficiently in the pair-wise vector reduction.
Figure 5:
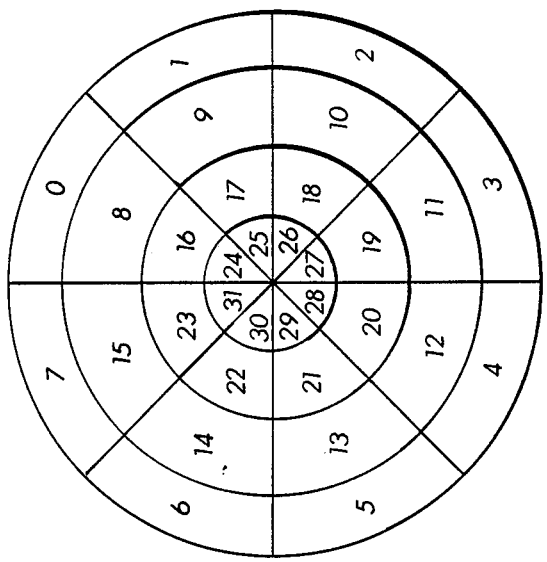
FIG. 5 is a pictorial representation of the organization of the vector memory in FIG. 4.
Figure 5:
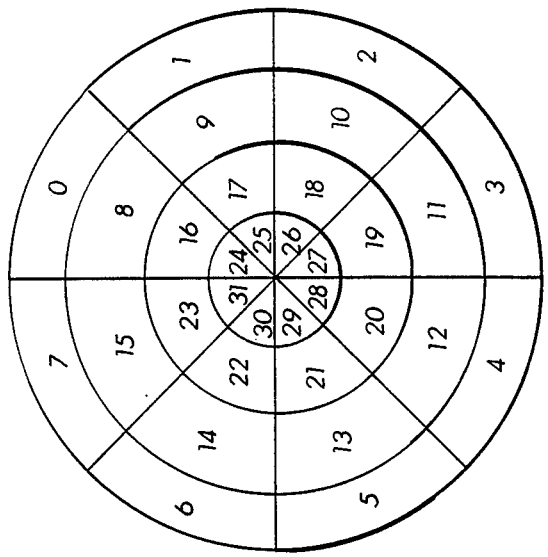

FIGS. 4, 5 and 6 show an application of the invention in a data processing apparatus having architecture and organization of the type disclosed in the aforementioned co-pending applications assigned to the same assignee as this application. In this embodiment, a vector memory 100 stores a plurality of 32 element vectors. FIG. 5 is a pictorial representation useful in understanding the organization of the memory 100. The elements of each vector are numbered 0, 1, . . ., 31. The vector memory is organized, as illustrated in FIG. 5 so that each vector is stored in two separate locations denominated as A-data and B-data. This organization allows two operands, or data elements, to be read—one from the A-data vector and one from the B-data vector—simultaneously by applying a read operand address to the A and B address logic units labeled A-ADRS and B-ADRS inputs to the vector memory 100 from the A address register 110 and the B address register 120 respectively. The read operands appear at the A-data output bus and B-data output bus.

One operand or element can be written into the vector memory 100 simultaneously with the read operation by applying a write operand address to the write address logic labeled C-ADRS from the C address register 130. The write operand is presented to the C address data logic (C-DATA) from the register 190. Each of the address registers 110, 120 and 130 contain a vector number and element number for an A-data read operation, a B-data read operation, and a write operation, respectively. These address registers may be incremented, held unchanged, or loaded with a value specified by a control unit 200 and under the direction of the control unit 200.

A pair of read operand data registers 140 and 150 pair adjacent vector elements and feed the pairs to an arithmetic pipeline processor 180. In this embodiment of the invention, data from the A vector store and the B vector store may be read out simultaneously but must be reordered into vector element pairs. As will be explained below, this is accomplished in part through the use of read operand staging registers 160 and 170. Register 140 and register 160 may each select from one of two inputs, as shown in FIG. 4 and each may be held unchanged under the direction of the control unit 200. Register 150 may select from one of three inputs as shown in FIG. 4 while register 170 has but a single input.

The arithmetic pipeline 180 receives its inputs from registers 140 and 150 and performs an operation specified by control unit 200 upon the paired elements of the vector. This operation is fixed throughout the vector reduction, and as previously explained, may include multiplication, addition, logical operation or comparison operation. The result of the pipeline operation is captured in the write operand data register 190 and stored as an element in the vector memory 100.

The organization of the vector memory 100 is pictorially illustrated in FIG. 5. Each 32 element vector is stored redundantly as A-data and B-data. The memory is so organized that the data elements in each pie shaped section may be read sequentially as though the elements were stored on a rotating memory, rotating counterclockwise past a stationary head, and as though the A-data storage and the B-data storage rotated in synchronism. That is to say at one clock phase any of the elements 0, 8, 16, or 24 may be read from the A vector and simultaneously any of the same elements may be read from the B vector. At the next phase any of the elements 1, 9, 17, or 25 may be read simultaneously from each of the two stored vectors. This organization gives rise to the algorithm explained in connection with FIG. 6 whereby the arithmetic pipeline 180 can be filled during the first pass of the pair-wise reduction of the vector.

Referring now to FIG. 6, in addition to FIGS. 4 and 5, this figure illustrates the flow of data through the pairing registers 140 and 150, and the staging registers 160 and 170 for the first eight pairing cycles of the first pass of the vector reduction. The same four blocks are repeated in each of eight frames in FIG. 6. The four blocks, as referenced in the first frame, correspond to the A register 140, the B register 150, the A staging register 160, and the B staging register 170. Each frame in FIG. 6 details the contents of the register, indicated by the element number of the data held by the register and the origin of that data element indicated by the arrow. The number of the element of data read out of the vector memory 100 is indicated along the bottom of FIG. 6.

The objective is to fill the pipeline arithmetic unit with vector element pairs. To this end, in the first frame data element 0 of the vector to be reduced is transferred from the A data port of the vector memory 100 to the data staging register 160. Simultaneously, data element 8 is transferred from the B data port to the staging register 170. In subsequent cycles of the first pass, the elements illustrated in the outer ring, namely 0, 1, 2, . . . 7, are read from the A-data port and the elements in the next most inner ring, namely 8, 9, 10 . . . 15 are read from the B-data port. These elements are arranged into a pair-wise order (0,1), (8,9), (2,3), (10,11), . . . (14,15) in the registers 140 and 150 during the first pass of the reduction. For each cycle of the first pass, the contents of registers 140 and 150 are transferred to the arithmetic pipeline and operated upon there. The result of each operation may be written into the vector memory 100 at an address location corresponding to the lower of the two operand element numbers.

Starting with frame 2 of FIG. 6, and for each even number frame or cycle thereafter during the first pass, the data from the A port of vector memory 100 is transferred to the B pair data register 150, and the contents of the B staging register 170 are transferred to the A staging register 160. For the third frame or cycle, and for all odd number frames, the contents of the A port of memory 100 are transferred to the A staging register 160 and the contents of the B staging register 170 are transferred to B pair data register 150. For all frames or cycles, the contents of A staging register 160 are transferred to A pair data register 140, and the data from the B port of memory 100 is transferred to B staging register 170. Thusly, paired elements of the vector can be coupled continuously to the arithmetic pipeline processor during the first pass through the vector.

It will be appreciated, that during the second eight cycles of the first half of the 32 element of the vector reduction, the element stream in the third most inner circle of FIG. 4 (16, 17 . . . 23) is read from the A-data port of the vector memory and the element stream 24, 25 . . . 32 is read from the B-data port. These element streams are rearranged into a pair-wise order (16, 17), (24, 25), (18, 19), . . . (30, 31) in the same manner as described for the first eight cycles or frames.

Figure 7B:
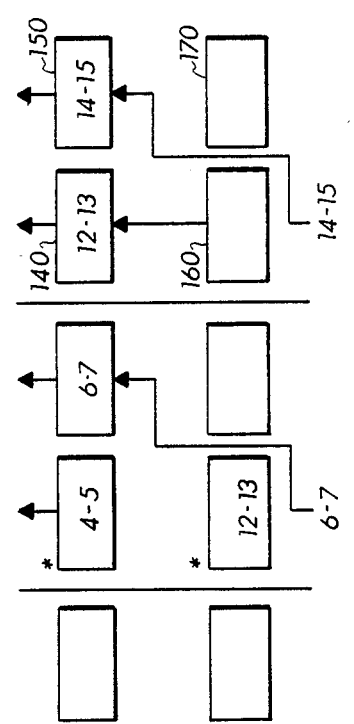
FIG. 7 includes FIGS. 7A and 7B positioned as shown and taken together depicts the flow of vector elements through the same registers as depicted in FIG. 5 for the second pass in the vector reduction operation.

In this illustrative embodiment, the first pass of the reduction requires 16 cycles during which all 32 elements of the original vector are read using both ports of the vector memory, and the results are written back into the vector memory. All subsequent passes operate on this scratch vector for both reads and writes. FIG. 7 shows the flow of data through the pair data registers and the staging data registers for the first eight cycles of the second pass of the reduction. The meaning of the components of this figure and the notation used are the same as that in FIG. 6. The asterisk near the upper left corner of an A register indicates that the register contents are unchanged during that cycle. The scratch vector elements are labeled as the element numbers of the original vector elements separated by a dot. During the second pass, and for all subsequent passes, only the A-data port of the memory is used. Sixteen cycles are necessary to read the partial results of the scratch vector, and the pipeline is not continuously filled during this or other subsequent passes.

In each subsequent pass, the scratch vector elements become more sparse by a factor of two, until only the final result remains. Nevertheless, in this embodiment, each subsequent pass requires sixteen cycles and the pattern and flow of the data elements for these subsequent passes are substantially the same as that shown in FIG. 7.

Some vector processing systems allow a programmer to specify an element count which defines the number of elements of a vector which is to be operated upon, starting with element 0 and a word, whose bits correspond to elements which are to be processed or discarded. By substituting an operation identity element for those elements beyond the specified element count or those elements corresponding to mask bits for which operands are to be discarded, an element count and a mask word can be effectively implemented for reductions. The identity elements may be coupled to the A register 140 or the B register 150 of FIG. 4, or at the inputs to the arithmetic pipeline.

Another means of implementing the effective substitution of an identity element is to provide a pass function in the arithmetic pipeline, in which either the A register input or the B register input is passed unaltered to the arithmetic pipeline output.

It will be appreciated that for vectors with two elements or less, processing may be terminated after the first pass. For vectors with four elements or less, processing may be terminated after the second pass, and so on. A 32 element vector requires five passes.

Thus it will be appreciated that the objectives of the invention have been accomplished. The pair element vector reduction provides a stable method with low hardware costs for performing vector reductions.

What is claimed is:

1. A system for computing vector reductions comprising:
 a vector memory means for storing and recalling data organized into vectors of elements and capable of simultaneously reading two vector elements and writing one vector element;
 a first and a second read operand address register means coupled to said vector memory means to provide address location information thereto;
 a first and a second read operand data staging register means also coupled to said vector memory means to receive and temporarily store operand data read from said vector memory means to thereby provide selective delay by the temporary storage;
 a first and a second read operand data register means coupled to said first and second read operand data staging register means and also coupled to said vector memory means to selectively receive data from said first and second read operand data staging register means or from said vector memory means;

an arithmetic pipeline means coupled to said first and second read operand data register means to receive and combine a first vector element and a second vector element into a combined intermediate result vector element;

a write operand address register means coupled to said vector memory means to provide a write address thereto; and a write operand data register means coupled between said arithmetic pipeline means and said vector memory means to provide a return loop for repeatedly returning the combined intermediate result vector element to the vector memory means at the address provided by said write operand address register means until the repeated returning of the combined intermediate result vector element to the vector memory means at the address provided produces a single final result vector element.

2. The apparatus as set forth in claim 1, wherein said first and said second read operand address register means and said first write operand address register means operate together to simultaneously permit the reading of two vector elements from said vector memory means and the writing of one vector elements into said vector memory means.

3. The apparatus as set forth in claim 2 wherein the vector memory means includes further means for allowing the simultaneous reading of two vector elements and the writing of one vector element to be directed to different elements of different vectors stored in said vector memory means.

* * * * *